United States Patent
Lee

(10) Patent No.: US 9,607,307 B2
(45) Date of Patent: Mar. 28, 2017

(54) REFERRAL PLATFORM

(75) Inventor: Waiki Lee, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2225 days.

(21) Appl. No.: 12/048,802

(22) Filed: Mar. 14, 2008

(65) Prior Publication Data
US 2009/0234730 A1    Sep. 17, 2009

(51) Int. Cl.
*G06Q 30/02* (2012.01)

(52) U.S. Cl.
CPC ......... *G06Q 30/02* (2013.01); *G06Q 30/0214* (2013.01); *G06Q 30/0241* (2013.01); *G06Q 30/0277* (2013.01)

(58) Field of Classification Search
CPC ........................... G06Q 30/02; G06Q 30/0214
USPC .......................................................... 705/14
See application file for complete search history.

(56) References Cited

U.S. PATENT DOCUMENTS

| | | | |
|---|---|---|---|
| 6,029,141 A | 2/2000 | Bezos | |
| 7,827,055 B1* | 11/2010 | Snodgrass et al. | 705/14.26 |
| 2001/0020231 A1* | 9/2001 | Perri et al. | 705/14 |
| 2002/0128916 A1 | 9/2002 | Beinecke, III | |
| 2003/0182185 A1 | 9/2003 | Dodd | |
| 2003/0236701 A1 | 12/2003 | Rowney | |
| 2004/0103022 A1 | 5/2004 | Chilcoat, III | |
| 2005/0119937 A1 | 6/2005 | Estes | |
| 2005/0171842 A1* | 8/2005 | Tien et al. | 705/14 |
| 2005/0182707 A1* | 8/2005 | Yeager | 705/37 |
| 2006/0106665 A1* | 5/2006 | Kumar et al. | 705/10 |
| 2006/0229936 A1 | 10/2006 | Cahill | |
| 2007/0124414 A1* | 5/2007 | Bedingfield et al. | 709/217 |
| 2007/0265921 A1 | 11/2007 | Rempe | |
| 2008/0120156 A1* | 5/2008 | Nusbaum | 705/7 |
| 2008/0167946 A1* | 7/2008 | Bezos et al. | 705/10 |
| 2009/0017804 A1* | 1/2009 | Sarukkai et al. | 455/414.3 |
| 2009/0164271 A1* | 6/2009 | Johnson et al. | 705/7 |
| 2009/0228366 A1* | 9/2009 | Biris et al. | 705/26 |

FOREIGN PATENT DOCUMENTS

| | | |
|---|---|---|
| WO | 0111472 A1 | 2/2001 |
| WO | 0101320 C1 | 3/2001 |

OTHER PUBLICATIONS

Enhance Your Site Referral with Incentives, http://www.ourmoderntimes.com/sitepromotion/enhance_your_site_referral_with_incentives.php, Dec. 17, 2007.

(Continued)

*Primary Examiner* — Jessica Lemieux
(74) *Attorney, Agent, or Firm* — Shook, Hardy & Bacon, L.L.P.

(57) ABSTRACT

Methods and computer storage media for creating referral links are provided. Receiving an advertiser's registration of a target page that offers goods or services for sale. Receiving a request for a referral link that is directed to the target page, wherein the referrer of the referral link requests the referral link from the target page. A referral link is then created and presented to the referrer. In some embodiment, an indication that the referral link has been utilized is received. And upon receiving an indication that the referral link was utilized, a reward unit is determined and presented to the referrer.

20 Claims, 4 Drawing Sheets

(56) References Cited

OTHER PUBLICATIONS

How Does Joe's Coffee Build a Referral Network?, http://www.referralads.com/tutorial/merchant_affiliates, Dec. 17, 2007.
Referral Tracker, http://www.cybie.com/addons/referral_tracker/, Dec. 17, 2007.

* cited by examiner

REFERRAL PLATFORM

BACKGROUND

Generally, sellers of goods and services advertise their products to increase sales opportunities. Sometimes, advertising is directed to a broad audience of consumers. Unfortunately, some of the consumers reached by this type of advertising are not interested in the goods or services offered for sale by the advertiser. Therefore the resources expended to reach those uninterested consumers do not generate a return for the advertiser. On the other hand, focused advertising occurs when the consumer, that receives notice of the goods or services that are for sale, is likely to be interested in purchasing the goods and services. Focused or targeted advertising provides a better return on the resources used as a result of interested consumers being the recipient of the advertising.

SUMMARY

Embodiments of the present invention relate to methods and computer storage media for creating referral links. Receiving an advertiser's registration of a target page that offers goods or services for sale. Receiving a request for a referral link that is directed to the target page, wherein the referrer of the referral link requests the referral link from the target page. A referral link is then created and presented to the referrer. The method may include determining when the referral link has been utilized. And upon determining the utilization of the referral link, a reward unit is determined and presented to the referrer.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWING

Embodiments are described in detail below with reference to the attached drawing figures, wherein.

DETAILED DESCRIPTION

Figure 1:
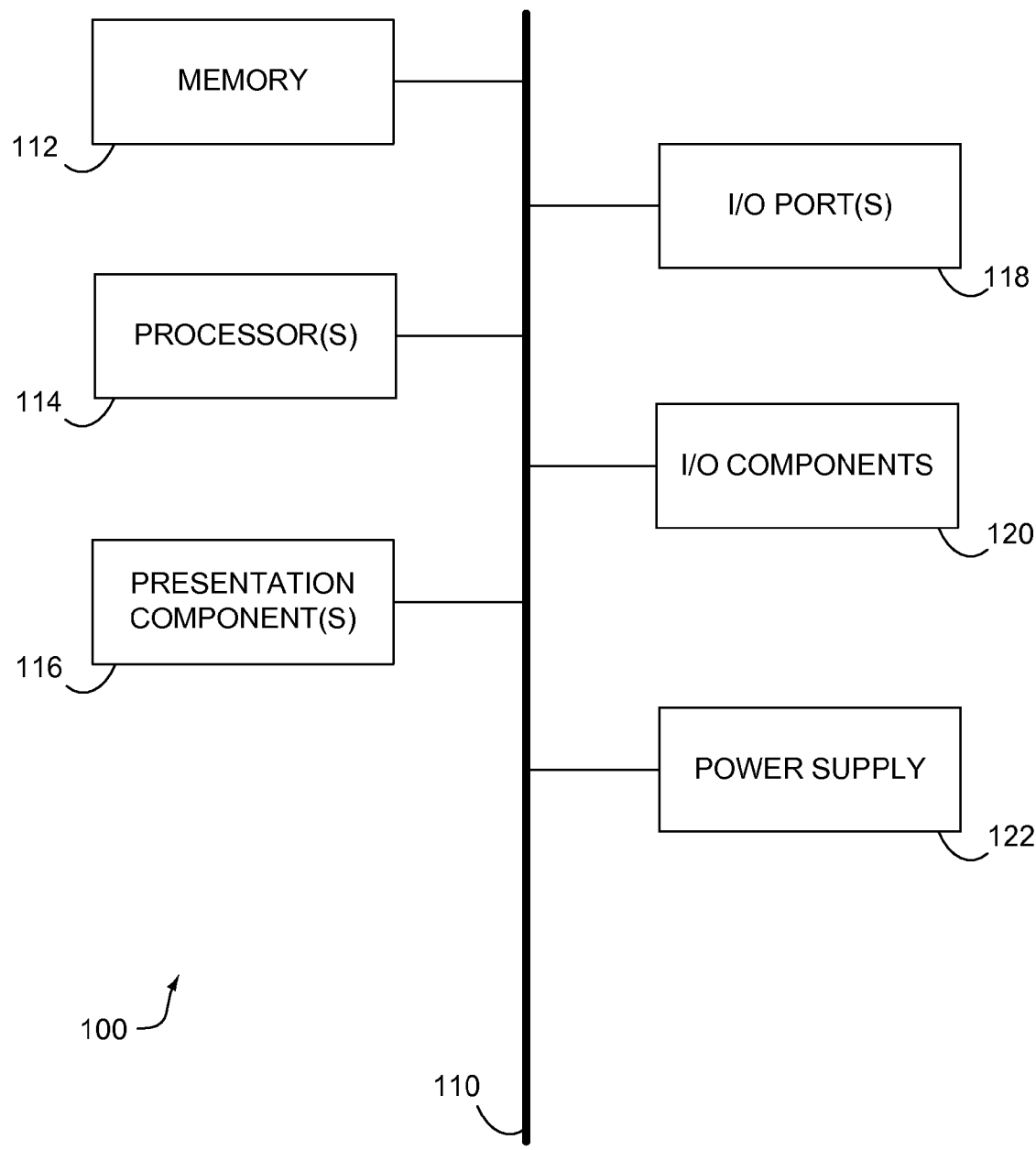
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, computer-implemented methods and computer storage media for creating referral links. Receiving an advertiser's registration of a target page that offers goods or services for sale. Receiving a request for a referral link that is directed to the target page, wherein the referrer of the referral link requests the referral link from the target page. A referral link is then created and presented to the referrer. The computer-implemented method may include determining when the referral link has been utilized. And upon determining the utilization of the referral link, a reward unit is determined and presented to the referrer.

Accordingly, in one aspect, a computer-implemented method for creating a referral link is provided. The method comprises receiving a registration from an advertiser, wherein the registration includes at least one target page for items and/or services that may be purchased, receiving a request for a referral link from a referrer, wherein the referrer requested the referral link from one of the at least one target page of the advertiser, creating a referral link that is directed to the one of the at least one target page, wherein the referral link is comprised of a unique identifier of the referrer, and presenting the referral link to the referrer.

In another aspect, one or more computer readable media having computer-usable instructions stored thereon for performing a method for creating a referral link are provided. The method comprising receiving a request for a referral link, determining a target page from which the referral link was requested, determining a referrer's identity, if the referrer's identity is not determinable, requesting the referrer's identity, storing the association of the referrer's identity and the target page, generating a referral link that is comprised of a unique identifier associated with the referrer's identity and the target page location, and presenting the referral link to the referrer.

A third aspect relates to one or more computer readable media having computer-usable instructions stored thereon for performing a method for creating a referral link. The method comprising receiving a request for a referral link from a referrer, wherein the referral link is directed to a target page for one or more items and/or services that may be purchased, determining the target page to which the referral link is directed, determining an identifier of the referrer, creating a referral link, wherein the referral link is comprised of a unique identifier that is associated with the identifier of the referrer and the location of the target page, presenting the referral link to the referrer, receiving an indication that the referral link was utilized to purchase at least one of the one or more items that may be purchased from the target page, determining a reward unit based on, at least one of the target page, the referral link, and the identifier of the referrer, and presenting the reward unit.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
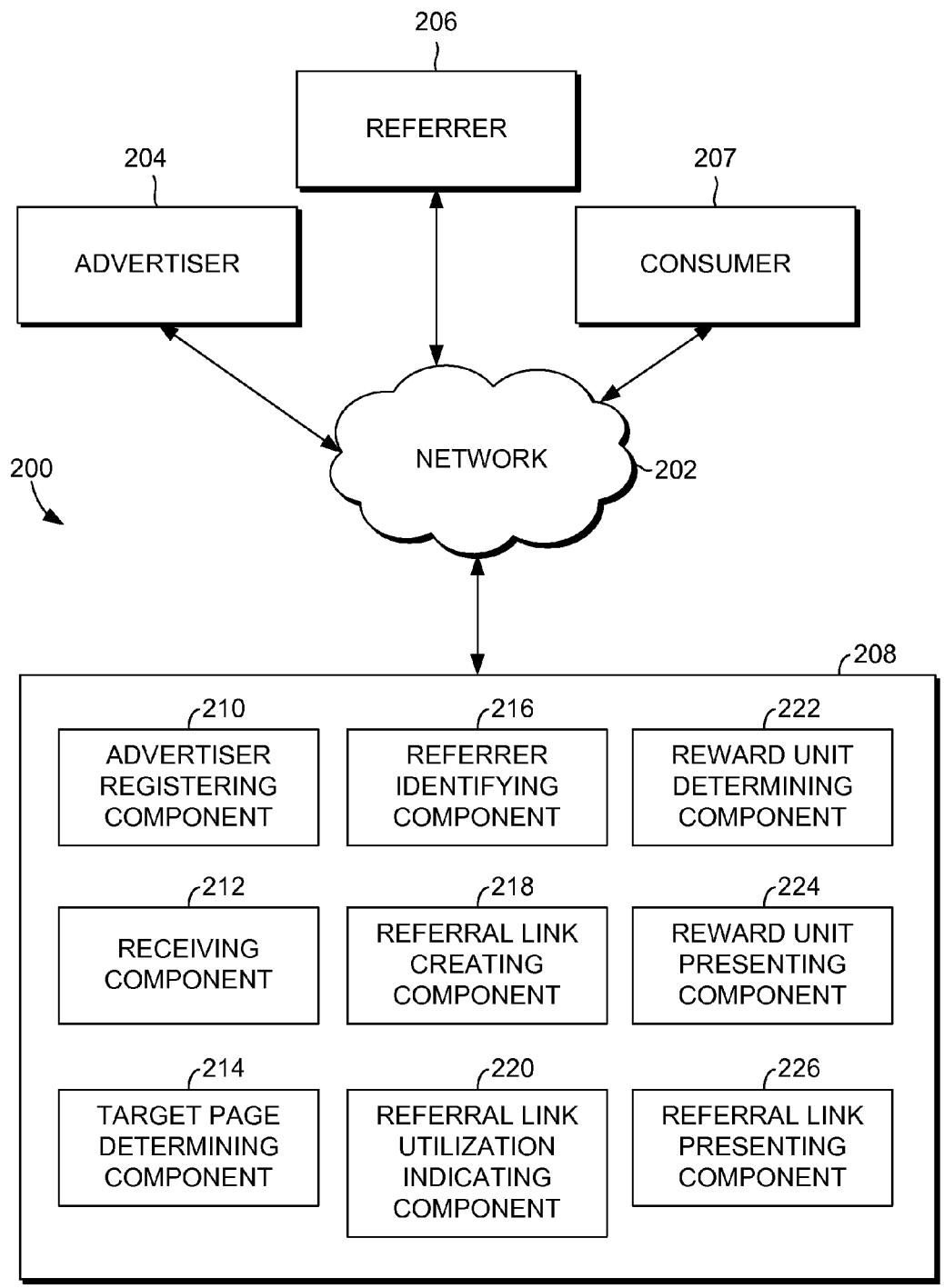
FIG. 2 is a block diagram illustrating an exemplary computing system architecture configured for use in implementing embodiments of the present invention.

With reference to FIG. 2, a block diagram illustrating an exemplary computing system architecture 200 configured for use in implementing embodiments of the present invention. Architecture 200 is comprised of one or more computing devices 204, 206, and 207. Architecture 200 is further comprised of referral link module 208. Referral link module 208 and computing devices 204 and 206 are all connected to a network 202. Network 200 includes, without limitation, one or more local area networks (LANs) and/or wide area networks (WANs). Such networking environments are commonplace in offices, residential networks, intranets, and the Internet. Accordingly, the network 200 is not further described herein.

An exemplary embodiment of computing devices 204 and 206 are described as computing device 100 of FIG. 1. Advertiser web page 204 offers goods and/or services to consumers. Advertiser web page 204 may reside on one or more servers or computing devices 100 as described in FIG. 1. Referrer 206 provides a referral link to the advertiser web page 204 referring one or more consumers 207 to advertiser web page 204 to purchase one or more goods and/or services from advertiser web page 204. Both referrer 206 and consumer 207 utilize a server or computing device 100 as described in FIG. 1. It will be appreciated that in embodiments the referrer 206 and consumer 207 may be the same entity or separate entities.

Referrer 206 is an entity that requests a referral link for advertiser web page 204. In embodiments, the referrer 206 requests a referral link from the advertiser, which is directed to an item for sale on the advertiser web page 204, in order to provide the referral link to consumer 207. A referral link directs consumers to one or more specific products, services and/or pages of advertiser web page 204. If the consumer 207 that receives a referral link utilizes the referral link to complete a purchase or other desired action, then the referrer 206 that provided the referral link is rewarded with a reward unit. It is understood and appreciated by those skilled in the art that the referral links are not limited to use on web pages and/or the Internet. Instead, the referral link can direct consumers to any point of purchase or sale that is desirable to the advertiser.

Consumer 207 is any entity that is capable of receiving and utilizing a referral link. A referrer 206 is an entity that requests a referral link for the advertiser web page 206 and may provide the referral link to another consumer 207. An advertiser utilizing advertiser web page 204 is an entity that is attempting to draw consumers to a point of presence of the advertiser. In an exemplary embodiment, an advertiser is a merchant with a web page on the Internet that offers goods or services for purchase.

Computing system architecture 200 is additionally comprised of a referral link module 208. Referral link module 208 is comprised of an advertiser registering component 210, a receiving component 212, a target page determining component 214, a referrer identifying component 216, a referral link creating component 218, a referral link utilization indicating component 220, a reward unit determining component 222, a reward unit presenting component 224, and a referral link presenting component 226.

In addition to the above listed components, referral link module 208, in an exemplary embodiment, is further comprised of a computing device (not shown). The computing device of referral link module 208 may be represented by computing device 100 as described in reference to FIG. 1. It is understood and appreciated by those skilled in the art that the visual depiction of referral link module 208 and the corresponding components as illustrated in FIG. 2 is merely for explanatory purposes and that the components of referral link module 208 may be associated with one another directly, or they may be associated through a network, such as network 202.

Advertisers registering component 210 registers an advertiser. In an exemplary embodiment, an advertiser registers at least one target web page. Registration of a target page may include identifying the location or address of that target page, registration may also include identifying the item or service that is offered for purchase on the target page. Additionally, the registration of a target page may include determining the reward unit that is awarded if a referral link is successfully utilized. Registration of an advertiser may also include establishing an account that provides financial information or a financial account that is used to reimburse for reward units that are distributed as a result of referral links successfully being utilized to draw consumers to the advertiser's target page.

A "reward unit" is any compensation or acknowledgment provided in exchange for successful utilization of the referral link. Examples of reward units include providing monetary rewards, discounts, store credits, free or reduced cost services, and free or reduced cost downloads. In an exemplary embodiment, a reward unity includes a free media download, such as a free song or movie download. Continuing with this exemplary embodiment, when a referrer requests a referral link that is directed to an advertiser's target page provides that referral link to a consumer, and the consumer uses that referral link to purchase the goods or services for sale on the target page, the referrer is provided a reward unit for the utilization of the referral link.

Additionally, advertiser registering component 210, in an exemplary embodiment, generates instructions for the target page. The instructions allow a referrer to request a referral link from the target page. For example, when an advertiser registers a target page, instructions are created that are incorporated into the target page to allow referrers to request referral links from the target page. In an alternative embodiment, the instruction incorporate on the target page are not specific to that target page, but instead are generic instruction that allow any page on which they are incorporated to be come a target page. Continuing with this embodiment, the referral link module 208 generates the referral link for that target page after determining the location of the page from which the request was generated. It is understood and appreciated by those skilled in the art that "instructions" as used herein are not limiting, but instead include coding, macros, commands, text, or other methods that allow for a referrer to request a referral link from a target page.

Receiving component 212 receives a request for a referral link. In an exemplary embodiment, a referrer requests a referral link from a target page; the request is received by receiving component 212. Receiving component 212, in alternative exemplary embodiments, receives information concerning the identity of the referrer, the utilization of the referral link, and the location of the target page associated with the referral link. The request for a referral link includes electronic requests that are received through the network 202. Once a request for a referral link is received, the target page determining component 214 determines which target page the request is associated with. A target page identifier may be included in the request for a referral link, or the target page determining component 214 has to determine which target page is associated with the request. The target page determining component 214, in an exemplary embodiment, identifies the unique location from which the request was received, and from that location determines, based on a database, which target page is associated with the received request for a referral link.

Referrer identifying component 216 identifies a referrer of a referral link. As previously discussed, the request for a referral link may include a unique identifier of the referrer. If the request for a referral link does include a unique identifier of the referrer, referrer identifying component 216 extracts that unique identifier from the request so that the unique identifier or some derivation of that identifier may be used in the resulting referral link. If the request for a referral link does not include a unique identifier for the referrer the referrer identifying component 216 attempts to identify the referrer. Various methods of identifying the referrer have been contemplated. Those methods include, but are not limited to, presenting a reply to the referrer wherein the reply requests a unique identifier of the referrer, establishing an account that is comprised of the referrer's personal information, cross-referencing one or more databases that include information on potential referrers. In an exemplary embodiment, a referrer provides an electronic mail address with the request for the referral link. The electronic mail address serves as a unique identifier of the referrer. Additionally, the electronic mail address also provides a way to present a reward unit if the resulting referral link is utilized. Other potential identifiers include the Internet-protocol (IP) address of the referrer, or similar network identifiers that are known to those skilled in the art. A unique identifier includes a username or account reference that is associated with an account established by the referrer in connection with requesting referral links.

Referral link creating component 218 creates a referral link. The referral link may be created in response to a request for the referral link, or the referral link may be created independent of a specific request for the referral link. In an exemplary embodiment, referral link creating component 218 creates a referral link in response to a request for the referral link. The referral link creating component 218 uses the unique identifier of the referrer, as determined by the referrer identifying component 216, and the target page location, as determined by the target page determining component 214, to create the referral link. In an exemplary embodiment, the unique identifier of the referrer is not explicitly included in the resulting referral link; instead a derivation of the unique identifier is included. For example, if the unique identifier of the referrer is the referrer's electronic mail address, a unique alpha-numeric code is associated with the electronic mail address to protect the identity of the referrer. The referral link includes the unique alpha-numeric code, and when the referral code is utilized, the unique alpha-numeric code is associated with the electronic mail address to provide the reward unit to the referrer. The translation between the alpha-numeric code and the referrer's identity is performed by the referral link module 208. It is appreciated by those skilled in the art that the unique identifier of the user is not limited to an electronic mail address or an alpha-numeric code; instead any method that allows the original referrer of a referral link to be associated with a resulting referral link has been contemplated. Additionally, it is appreciated by those skilled in the art that a referral link is not limited to a hypertext link or Internet address. Instead, a referral link is anything that allows a referrer to direct another entity to a target page, wherein the referral link also provides a way for the referrer to be given credit for any resulting desirable actions from the referral link.

Referral link presenting component 226 presents the referral link created by referral link creating component 218. The presenting of a referral link includes electronic mailing the referral link, displaying the referral link on a display device, transmitting the referral link to the referrer, displaying the referral link on a webpage, and incorporating the referral link in an advertisement. It is understood and appreciate by those skilled in the art that the presentation of the referral link is not limited to the methods of presentation above, but instead the referral link may be presented in any manner that provides the referral link to the referrer in such a way as the referrer can provide the referral link to at least one consumer.

Referral link utilization indicating component 220 indicates that a referral link has been utilized. In an exemplary embodiment, the referral link utilization indicating component 220 receives information that a desirable action has occurred on a target page as a result of a referral link. Information on the utilization of a referral link may be provided by the target page, the checkout page associated with the target page, or a confirmation page associated with the target page. For example, if a referral link is directed to a target page that sells a pair of shoes, a consumer uses the referral link to land at the shoe page, and the consumer purchases the shoes from the shoe page, an indication of the utilization of the referral link is sent to the referral link utilization indicating component 220 by the site that includes the shoe page. The site that includes the target page may have been coded to recognize a referral link and to transmit the indication of successful utilization of the referral link. Or the referral link may include the necessary information, that when utilized, provides an indication to the referral link utilization indicating component 220. When there is an indication of the utilization of a referral link, the referrer associated with the utilized referral link is rewarded with a reward unit.

In an exemplary embodiment of the present invention, a referral link is utilized even if the goods or service of the target page are not purchased, but instead a goods or service offered for purchase on a related page are purchased. For example, if the referrer requests a referral link to a target page offering for purchase a pair of white shoes with blue stripes. The referral link is distributed by the referrer to a consumer. The consumer uses the referral link to land on the target page, but instead of purchasing the white shoes with a blue stripe, the consumer navigates the advertiser's web page that is comprised of the target page and finds a different pair of white shoes with red stripes for sale. When the consumer purchases the white shoes with red stripes, even though that particular pair of shoes was not on the target page, if the advertiser, has provided that related purchases are rewardable, then the referrer will receive a reward unit for the purchase of the white shoes with red stripes even though the target page offered a different product. It is understood and appreciated by those skilled in the art that a reward unit may be earned in situations other than when the goods or services of the target page are purchased. For example, a reward unit is earned in an exemplary embodiment when a consumer visits the target page, or when a consumer completes a survey at the target page. It is also understood that the desirable actions that constitute utilization of the referral link may occur on alternative pages than the target page.

Reward unit determining component 222 determines the reward unit that is due to a referrer after a referrer's referral link has been utilized. In an exemplary embodiment, the reward unit determining component 222 evaluates at least one of the following: the referral link that was utilized, the target page, the advertiser's registration and the referrer's identifier. This evaluation may indicate the type of reward unit that is available to a specific referrer based on the item or service that was purchased from the target page. For example, the advertiser's registration may establish the reward unit associated with the purchase of an item from a target page. Continuing with this example, the advertiser may indicate that if the item is purchased from the registered target page, the reward unit is a free song download from an online music store. Therefore, the reward unit determining component 222 would determine from the advertiser's registration that the appropriate reward unit is a free song download and that reward unit is to be presented to a particular referrer based on the referrer's identifier as determined by the referral link utilization indicating component 220.

The reward unit presenting component 224 presents a reward unit to a referrer. The referrer that is presented with a reward unit is the referrer that requested the referral link that was utilized. In an exemplary embodiment a reward unit is presented by electronic mailing the reward unit, a link to the reward unit, a coupon to the reward unit, or a credit to the reward unit to the electronic mail address of the referrer. Additional ways to present a reward unit includes crediting an account of the referrer, mailing the reward unit, notifying the referrer of the reward unit. It is understood and appreciated by those skilled in the art that the presenting of a reward unit can be accomplished in a variety of methods such that the referrer is provided with a reward unit or a way to receive the benefit of a reward unit.

Figure 3:
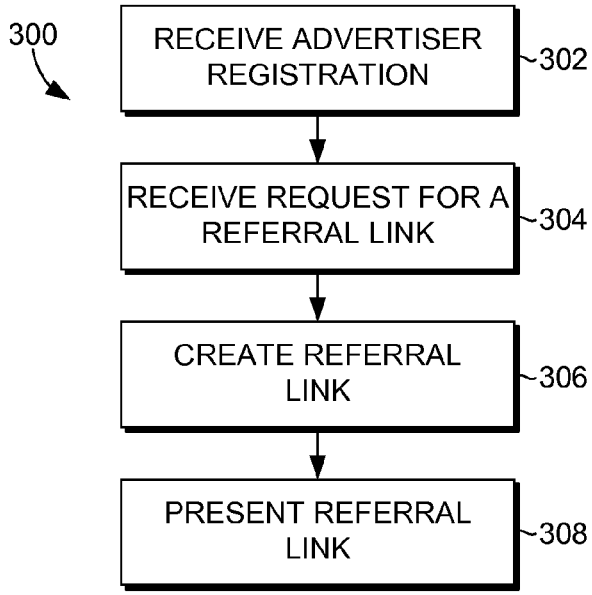
FIG. 3 is a flow diagram of an exemplary method for creating a referral link, in accordance with an embodiment of the present invention.

Turning now to FIG. 3, a flow diagram illustrates an embodiment of the method 300 for creating a referral link. Represented at block 302 is the receiving of an advertiser's registration. In an exemplary embodiment of the present invention, the registration received from the advertiser includes the location of a target page for which the advertiser will provide a reward unit for the utilization of a referral link with and item or service of that target page. Additionally, the registration includes the type of reward unit that is provided for the utilization of a referral link in association with the target page. The registration by an advertiser, in an exemplary embodiment, includes information relating to account, payment, or billing that is used to compensate for the presentation of reward units as a result of referral link utilization. In additional embodiments of the present invention, the advertiser's registration includes defining the reward unit, the conditions that represent utilization of the referral link, and when the referral link along with the associated offer for a reward unit expires. Examples of conditions that represent utilization of the referral link includes mandating that a purchase is made, a click-through is performed, and a sign-up is completed by the consumer.

Following registration by an advertiser, in an exemplary embodiment, instructions are generated. The instructions are presented to the advertiser to enable referrers to request referral links. For example, after registering a target page, an advertiser is presented with instructions that are inserted into the code of the target page. Once the instructions have been inserted into the code of the target page, the target page provides a requester with a component that allows the referrer to request a referral link. Examples of a component include links, graphical indicators, auditory indicators, and combinations of each. In an exemplary embodiment, the instructions, once placed on a target page, provide an indication that a referral opportunity is associated with the target page. Additionally, the instructions provide that when the indication is selected by a referrer, the instruction determine the referrer's identity. Finally, in this exemplary embodiment, the instructions create the referral link that is presented to the referrer. In this exemplary embodiment, the instructions utilize the components and modules of the computing device that serves the target page. It is understood and appreciated by those skilled in the art that the instructions provided to the advertiser may be in the form of a computer-executable programming language that can be incorporated into the target page or a related page, and the instructions may also be reference code that references additional computer-executable programming that is remote from the target page.

Represented at block 304, is the receiving of a request for a referral link. For example, a consumer, that becomes a referrer, requests a referral link from a target page that offers goods or services for purchase. Continuing with this example, the referrer requests the referral link so that the referrer can provide the referral link to other consumers for their utilization and his reward. The referrer is rewarded when a referral link requested by the referrer is utilized. In an exemplary embodiment of the present invention a referrer requests a referral link, the referral link is created and presented to the referrer, the referrer then places the referral link on a website that the referrer operates, a consumer clicks on the referral link from the referrer's website, the consumer then purchases the item the referral link is directed to, the website offering the item for sale presents a confirmation that the referral link was utilized, and the referrer is presented with a reward unit.

Represented at block 306, is the creation of a referral link. After receiving a request for a referral link, the referral link that was requested is created. The creation of a referral link, in an exemplary embodiment includes creating the referral link based on the identity of the referrer and the location of the target page upon which the referral link was requested. The creation of a referral link, in another exemplary embodiment, also takes into consideration the reward unit that is available for the target page. Additionally, in an exemplary embodiment, the creation of the referral link takes into consideration information required for a referral link to be indicated that it has been utilized.

Represented at block 308, is the presentation of the referral link. A referral link is presented to the referrer of the referral link. For example, if a consumer visits a target page and believes that the goods being offered for purchase on the target page would be appreciated by a friend, the consumer requests the referral link, at which point the consumer becomes a referrer. After the referral link is created, it is then presented to the referrer. The referrer then, in an exemplary embodiment, electronic mails the referral link to a consumer that the referrer believes would be interested in the goods or services offered for purchase on the target page. It is understood and appreciated by those skilled in the art that the blocks of method 300 are arranged in the represented sequence only for illustrative purposes and the method 300 may occur in any and all sequences or orders that allow for the method to be performed.

Figure 4:
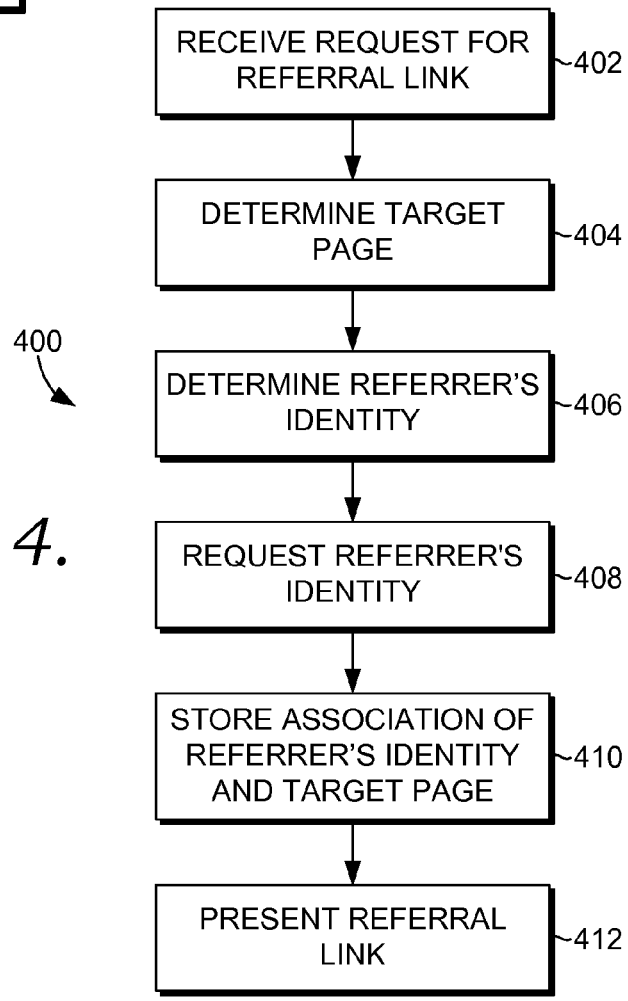
FIG. 4 is a flow diagram of an exemplary method for creating a referral link, in accordance with an embodiment of the present invention.

Referring to FIG. 4, a flow diagram illustrates an embodiment of the method 400 for creating a referral link. At block 402 a request for a referral link is received. The request for a referral link, in an exemplary embodiment, is from a referrer. Upon receiving a request for a referral link, the target page is determined, as represented at block 404. For example, when a referrer requests a referral link from a target page, the request is received and the target page that the referral link is directed to is determined so that the referral link can be created. The determination of the target page, in an exemplary embodiment, includes the determination of the target page location.

Method 400 continues with determining the identity of a referrer as represented at block 406. In an exemplary embodiment, the determination of a referrer's identity includes determining a unique identifier of the referrer. A unique identifier, as previously discussed, includes a username, an alpha-numeric code, an electronic mail address, and a cookie associated with the referrer. It is understood and appreciated by those skilled in the art that a referrer can be identified in a variety of way so long as the referrer that requested a particular referral link is uniquely associated with the resulting referral link. However, if the referrer's identity is not ascertainable from the request for the referral link or from information associated with the referrer, then a request for the referrer's identity is made, as referenced at block 408. The request for a referrer's identity may be in the form of a web-based message, such as a an instant messages, and electronic message, a displayed notice from the target page, a pop-up dialogue window, or other methods to request the referrer's identity at the time of the referrer's request for a referral link. For example, in an exemplary embodiment of the present invention, when the referrer's identity is not determined, a request for the referrer's identity is made. Otherwise, communication or presentations to the referrer regarding the resulting referral link may not be possible. It is understood and appreciated by those skilled in the art that the determination and the request for the referrer's identification are not limited to the embodiments discussed herein. Instead additional embodiments have been contemplated based on the Internet Protocol address of the referrer or other known identifiers that uniquely identify the referrer are alternative embodiments.

The association between the referrer's identity and the target page are stored as represented at block 410. The referrer's identity and the target page to which the referral link is directed are stored to provide an association that is referenced when creating a referral link. The referral link is created based on the information of the target page, such as location, and the referrer's identity so that a unique referral link is created that allows for the referrer to be identified upon the utilization of the referral link. In an exemplary embodiment, the referrer's identity is translated into a nondescript alpha-numeric code that is also stored in association with the referral link information so that the resulting referral link does not provide conceivable information on the identity of the referrer. The advantage of a non-descript alpha-numeric code is that the identity of the referrer is maintained in confidence while still allowing for the easy association between a referral link that is utilized and the referrer that is entitled to the resulting reward unit.

In yet an additional embodiment, the target page location information is not directly used in the referral link, instead a derivation or unrelated locator is utilized that provides for redirection of the referral link. For example, if including the entire Internet address of a target page would result in an excessively long referral link, a shorter Internet address is utilized, that when accessed, redirects to the longer, target page Internet address. An advantage of creating the referral link from a shorter address that allows for a redirection to the target page is that the resulting referral link is comprised of less information. Additionally, an exemplary embodiment of the present invention creates a referral link that is not directly pointed at the target page, but instead is directed to a unique forwarding location. Once a referral link is used to enter a unique forwarding location the related target page and user identification information is incorporated in the forwarding directions. This allows the consumer using the referral link to land on the target page, but the referral link did not include intelligible information relating to the target page nor the referrer's identity.

Method 400 is further comprised of presenting the referral link as represented at block 412. As previously discussed, a referral link is presented to the referrer. The presentation of a referral link allows the referrer to further provide the referral link to consumers that will utilize the referral link. In an exemplary embodiment, upon the utilization of a referral link, the referrer is presented with a reward unit corresponding to the referral link, and the target page.

Figure 5:
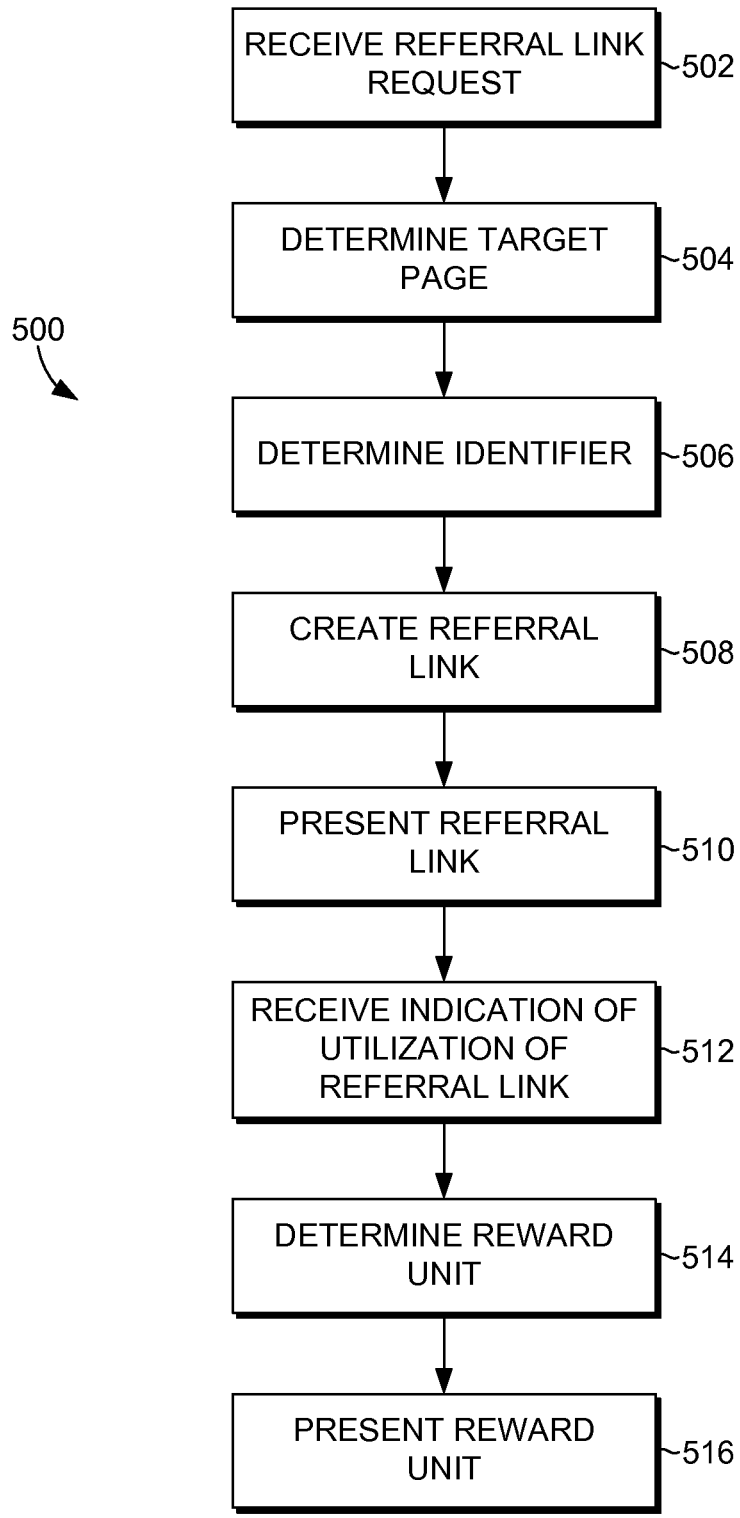
FIG. 5 is a flow diagram of an exemplary method for creating a referral link, in accordance with an embodiment of the present invention.

Turning now to FIG. 5, a flow diagram illustrates an embodiment of the method 500 for creating a referral link. Method 500 is comprised of receiving a referral link request, as represented at block 502. Determining the target page is represented at block 504. Determining the identifier of the referrer is represented at block 506. Creating a referral link, as represented at block 508. Presenting the referral link to the referrer, as represented at block 510. Receiving an indication of the utilization of the referral link, as represented at block 512. Determining the reward unit associated with the utilized referral link, as represented at block 514. And presenting the reward unit to the referrer of the utilized referral link, as represented at block 516.

What is claimed is:

1. Performing a method for creating a referral link, the method comprising:
   receiving a request for a referral link at a referral link server from a remote computing device associated with a referrer over the Internet;
   determining a target page from which the referral link was requested;
   determining a referrer's identity;
   if the referrer's identity is not determinable, requesting the referrer's identity;
   storing the association of the referrer's identity and the target page;
   generating a referral link comprised of a unique identifier that is directed to a unique forwarding location and does not include intelligible information relating to the target page or the referrer's identity;
   providing the referral link without intelligible information relating to the target page or the referrer's identity over a communication channel to the remote computing device associated with the referrer, wherein providing the referral link without intelligible information relating to the target page or the referrer's identity protects the referrer's identity while also associating the referrer's identity with the referral link; and
   determining a reward unit for the utilization of the referral link for situations other than when the goods or services of the.

2. The method of claim 1 wherein the processor is further configured to receive an indication of the utilization of the referral link.

3. The method of claim 2 wherein the processor is further configured to determine, based on the referral link, the identity of the referrer.

4. The method of claim 1 wherein the processor is further configured to provide the reward unit to the referrer.

5. The method of claim 1, wherein the identity of the referrer is an electronic-mail address of the referrer.

6. Performing a method for creating a referral link, the method comprising:
   receiving a request for a referral link from a referrer, wherein the referral link is directed to a target page for one or more items and/or services that may be purchased;
   determining the target page to which the referral link is directed;
   determining an identifier of the referrer;
   creating a referral link comprised of a unique identifier that is directed to a unique forwarding location and does not include intelligible information relating to the target page or the referrer's identity;
   providing presenting the referral link without intelligible information relating to the referrer's identity to the referrer, wherein providing the referral link without intelligible information relating to the referrer's identity protects the referrer's identity while maintaining an association between the referrer's identity and the referral link; receiving an indication that the referral link was utilized to purchase at least one of the one or more items that may be purchased on alternate pages;
   determining a reward unit based on at least one of the target page, the referral link, and the identifier of the referrer; and presenting the reward unit.

7. A computing system comprising a memory comprising instructions for execution by one or more processors, the one or more processors being coupled to the memory and operable to execute the instructions to:
   receive by a receiver request from a referrer for a referral link;
   determine by a target page determiner a target page that is associated with the referral link;
   identify by a referrer identifier the referrer of the referral link;
   create a referral link by a referral link creator using an identifier that specifically corresponds to the referrer and a location of the target page, wherein the referral link includes a derivation of the identifier that protects the identity of the referrer;
   communicating by a referral link communicator the referral link with the derivation of the identifier that protects the identity of the referrer, wherein communication of the referral link with the derivation of the identifier that protects the identity of the referrer allows for protection of the referrer's identity while maintaining an association between the referrer's identity and the referral link; and
   a reward unit determiner.

8. The system of claim 7, wherein the referral link creator to creates the referral link independent of the request for a referral link or in response to the request for a referral link.

9. The system of claim 7, further comprising:
   a referral link utilization indicator to indicate utilization of the referral link.

10. The system of claim 7, wherein the referrer identifier identifies the referrer using the identifier that specifically corresponds to the referrer included within the request.

11. The system of claim 7, wherein the referrer identifier identifies the referrer by soliciting the referrer for information, establishing an account comprising personal information of the referrer, referencing a database, identifying an internet protocol address, or a combination thereof.

12. The system of claim 7, wherein the reward unit includes one or more of a discount, purchase credit, store credit, reduced cost service, free service, reduced cost download, or free download.

13. The system of claim 7, wherein the identifier that specifically corresponds to the referrer includes a reference associated with an account for receiving reward units, the account being specific to the referrer.

14. The system of claim 7, wherein the reward unit determiner determines one or more of a quantity or type of reward unit to be provided to the referrer based on utilization of the referral link.

15. The system of claim 13, wherein the reward unit determiner evaluates one or more of the referral link, the target page, the identifier that specifically corresponds to the referrer, and an advertiser registration in determining the reward unit to be provided to the referrer.

16. The system of claim 13, wherein the reward unit determiner presents the determined reward unit to the referrer.

17. The system of claim 7, wherein in response to instructions to request a referral link, the referral link creator generates the referral link for the identified target page upon determining the location of said target page having generated the request.

18. The system of claim 7, further comprising an advertiser registrar to register an advertiser, to register at least one target page having an identifying web address, to identify at least one item or service offered for purchase via the at least one target page, to determine a reward unit that corresponds to utilization of a referral link via the at least one target page, or a combination thereof.

19. The system of claim 7, wherein the referral link includes the identifier, the identifier comprising an alpha-numeric code associated with an electronic mail address to which the reward unit may be provided, further wherein the referral link module translates the alpha-numeric code to determine the referrer's identity.

20. The system of claim 7, wherein the referral link directs another entity to the target page and facilitates providing the reward unit to the referrer of the referral link based on utilization of the referral link.

* * * * *